(12) United States Patent
Mizuno et al.

(10) Patent No.: US 9,620,260 B2
(45) Date of Patent: Apr. 11, 2017

(54) INSULATING COATED WIRE AND METHOD FOR MANUFACTURING THE SAME

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Housei Mizuno, Mie (JP); Hiroki Hirai, Mie (JP); Tomoyuki Sakata, Mie (JP); Takehiro Hosokawa, Mie (JP); Yasuyuki Ootsuka, Mie (JP); Satoshi Murao, Mie (JP); Seigou Nakano, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 14/647,542

(22) PCT Filed: Jun. 7, 2013

(86) PCT No.: PCT/JP2013/003613
§ 371 (c)(1),
(2) Date: May 27, 2015

(87) PCT Pub. No.: WO2014/091637
PCT Pub. Date: Jun. 19, 2014

(65) Prior Publication Data
US 2015/0310961 A1     Oct. 29, 2015

(30) Foreign Application Priority Data
Dec. 14, 2012   (JP) .................................. 2012-273242

(51) Int. Cl.
*H01B 7/00*    (2006.01)
*H01B 3/30*    (2006.01)
(Continued)

(52) U.S. Cl.
CPC ............ *H01B 3/302* (2013.01); *B29C 47/025* (2013.01); *B29C 49/20* (2013.01); *B29C 51/10* (2013.01);
(Continued)

(58) Field of Classification Search
CPC .... H01B 13/06; H01B 3/302; H01B 13/0009; H01B 7/24; B29C 47/003; B29C 47/025
(Continued)

(56) References Cited

U.S. PATENT DOCUMENTS 3,607,387 A * 9/1971 Lanza ..................... B32B 27/00
                                                        174/110 N
3,892,912 A * 7/1975 Hauck ................... B29C 47/128
                                                         174/113 R
(Continued)

FOREIGN PATENT DOCUMENTS

JP    59-88820    6/1984
JP    64-36917    3/1989
(Continued)

OTHER PUBLICATIONS

Search report from PCT/JP2013/003613, mail date is Aug. 6, 2013.

*Primary Examiner* — Sherman Ng
(74) *Attorney, Agent, or Firm* — Greenblum & Bernstein, P.L.C.

(57) ABSTRACT

An insulating coated wire includes a center conductor and an insulating coating. The insulating coating has a bending auxiliary section in which the thickness of the insulating coating is smaller than that of the other portion, and that has a shape in which at least a part thereof protrudes outward in (Continued)

the radial direction. The bending auxiliary section has a shape that facilitates bending of the insulating coated wire by elongation deformation thereof. This insulating coated wire can be manufactured by arranging, on the circumference of an insulating coated wire material, a metal mold that has the inner surface including the section having a shape protruding outward in the radial direction, and forming the bending auxiliary section in the shape along the inner surface of the metal mold by heating the insulating coating within the metal mold and generating a pressure difference between inside and outside of the insulating coating.

6 Claims, 4 Drawing Sheets

(51) Int. Cl.
| | |
|---|---|
| B29C 47/02 | (2006.01) |
| H01B 13/06 | (2006.01) |
| B29C 49/20 | (2006.01) |
| H01B 3/44 | (2006.01) |
| B29D 23/00 | (2006.01) |
| B29C 51/10 | (2006.01) |
| B29C 51/12 | (2006.01) |
| B29C 47/00 | (2006.01) |
| H01B 7/24 | (2006.01) |
| B29K 101/12 | (2006.01) |
| B29K 705/00 | (2006.01) |
| B29L 9/00 | (2006.01) |
| B29L 31/34 | (2006.01) |
| B29L 23/18 | (2006.01) |
| H01B 13/00 | (2006.01) |

(52) U.S. Cl.
CPC ............ B29C 51/12 (2013.01); B29D 23/005 (2013.01); H01B 3/307 (2013.01); H01B 3/44 (2013.01); H01B 13/06 (2013.01); *B29C 47/003* (2013.01); *B29C 2049/2021* (2013.01); *B29K 2101/12* (2013.01); *B29K 2705/00* (2013.01); *B29K 2715/00* (2013.01); *B29K 2995/0007* (2013.01); *B29L 2009/003* (2013.01); *B29L 2009/005* (2013.01); *B29L 2023/183* (2013.01); *B29L 2031/3462* (2013.01); *H01B 7/24* (2013.01); *H01B 13/0009* (2013.01)

(58) Field of Classification Search
USPC ........................................ 174/72 A
See application file for complete search history.

(56) References Cited

U.S. PATENT DOCUMENTS

| | | | | |
|---|---|---|---|---|
| 4,970,351 A | * | 11/1990 | Kirlin | H02G 3/0406 138/121 |
| 6,051,789 A | * | 4/2000 | Kato | B29C 47/0023 138/121 |
| 2011/0297415 A1 | * | 12/2011 | Katou | B60R 16/0215 174/68.3 |
| 2013/0161092 A1 | * | 6/2013 | Kurita | H02G 3/0481 174/72 A |

FOREIGN PATENT DOCUMENTS

| | | |
|---|---|---|
| JP | 2-265107 | 10/1990 |
| JP | 8-098368 | 4/1995 |
| JP | 2009-277438 | 11/2009 |

* cited by examiner

INSULATING COATED WIRE AND METHOD FOR MANUFACTURING THE SAME

TECHNICAL FIELD

The present invention relates to an insulating coated wire that is to be arranged in an automobile or the like, and a method for manufacturing the same.

BACKGROUND ART

An insulating coated wire includes a center conductor and an insulating coating that covers the center conductor. When such an insulating coated wire is arranged in an automobile or the like, the insulating coated wire is used while being bent at an appropriate position into the shape that is suitable for the arrangement position. However, an electrical wire that has so large a diameter that a high current flows therethrough, such as an electrical wire that connects battery terminals arranged close to each other, has the problem of not being able to easily be bent due to the high hardness of an insulating coating, and making the wiring operation difficult.

As means for solving this problem, Patent Document 1 discloses a method including the steps of removing a coating material from a portion of an insulating coated wire that is to be bent, and mounting the electrical wire on a protector while arranging the portion from which the coating material is removed along a bent section of the protector.

The above-described method requires the operation for removing the insulating coating from a portion that is to be bent, and the operation for mounting the portion from which the insulating coating is removed on the protector separate from the electrical wire. It is significantly troublesome to perform these operations at a place at which wiring is performed, and an improvement in efficiency of the wiring operation cannot be expected to be achieved. Such a disadvantage becomes more serious as the electrical wire has greater number of portions to be bent.

CITATION LIST

Patent Documents

Patent Document 1: JP H8-98368A

SUMMARY OF INVENTION

It is an object of the present invention to provide an insulating coated wire that can be bent at an appropriate portion without requiring a troublesome operation and a complicated structure, and a method for making it possible to easily manufacture the insulating coated wire.

An insulating coated wire provided by the present invention includes a center conductor, and an insulating coating that is made of an insulating synthetic resin material and covers the center conductor. The insulating coating includes a bending auxiliary section that is formed at a part in the axial direction thereof, and has a thickness in the bending auxiliary section that is smaller than that of the other portion, the bending auxiliary section having a shape in which at least a part thereof protrudes outward in the radial direction of the insulating coating electrical wire, and that facilitates bending of the insulating coated wire by elongation deformation thereof.

Furthermore, a method provided by the present invention is a method for manufacturing the above-described insulating coated wire, the method including the steps of preparing an insulating coated wire material that includes a center conductor and an insulating coating that is made of an insulating thermoplastic resin material and covers the center conductor; arranging a metal mold on the circumference of at least a part in the axial direction of the insulating coated wire material, the metal mold having an inner surface that has a part having a shape protruding outward in the radial direction with respect to the outer circumferential surface of the insulating coated wire material; and forming, on the insulating coating, the bending auxiliary section that has the shape along the inner surface of the metal mold, by generating a pressure difference in which a pressure inside the insulating coating is higher than a pressure outside the insulating coating within the metal mold in a state in which the insulating coating is heated within the metal mold to a temperature at which the thermoplastic resin material constituting the insulating coating is softened, the bending auxiliary section being such that an insulating coating thickness thereof is smaller than that of the other portion, and having a shape that facilitates bending of the insulating coated wire by elongation deformation of the bending auxiliary section thereof.

DESCRIPTION OF EMBODIMENTS

The preferred embodiment of the present invention will be described with reference to the drawings.

Figure 1:
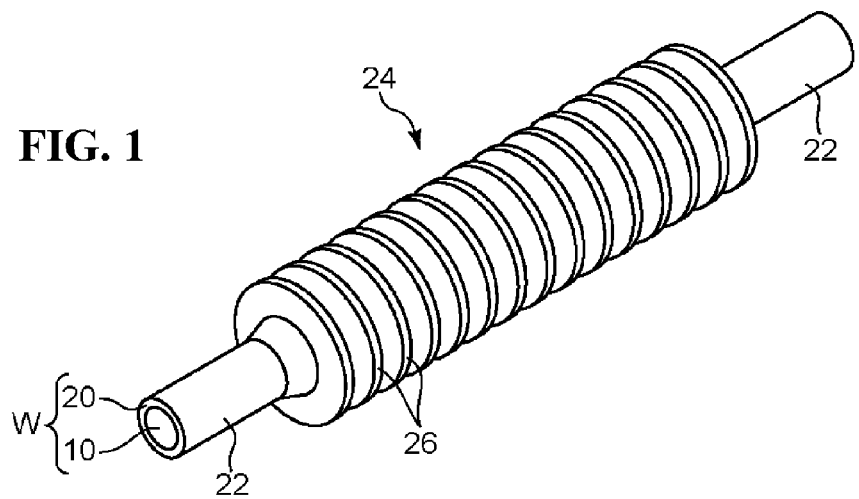
FIG. 1 is a perspective view showing the relevant part of an insulating coated wire according to an embodiment of the present invention.
Figure 2:
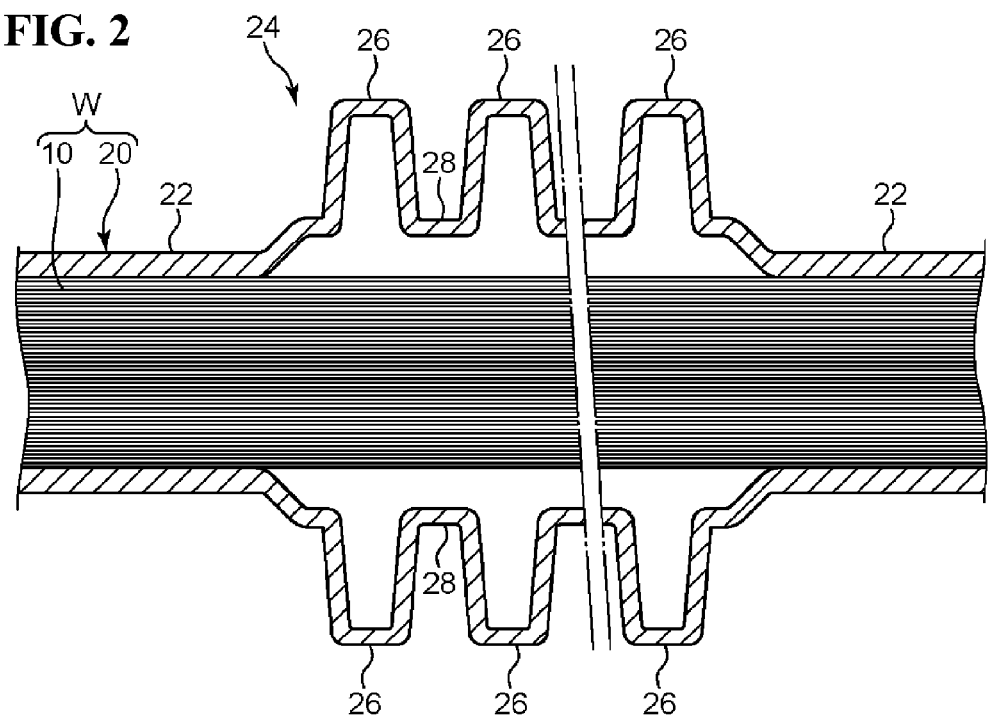
FIG. 2 is a cross-sectional front view showing the relevant part of the insulating coated wire.

FIGS. 1 and 2 show an insulating coated wire W according to the present invention. This insulating coated wire W includes a center conductor 10, and an insulating coating 20 that covers the center conductor 10. Any material that has a high conductivity can be used for the center conductor 10, and the center conductor 10 is constituted, for example, by a single or a plurality of bare wires that are made of a metal material such as copper that has an excellent conductivity. The insulating coating 20 is made of an insulating synthetic resin material.

This insulating coated wire W is characterized in that the insulating coating 20 has a bending auxiliary section 24 at a part in the axial direction thereof. This bending auxiliary section 24 is different in shape from the section of the insulating coating 20 that is other than the bending auxiliary section 24, that is, a normal diameter section 22 in which the inner circumferential surface of the insulating coating 20 is in close contact or substantially in close contact with the outer circumferential surface of the center conductor 10. This shape is such that the thickness is smaller than the normal diameter section 22 and the bending auxiliary section 24 protrudes outward in the radial direction, that is, the shape is such that elongation deformation of the bending auxiliary section 24 in the direction in which the degree of protrusion decreases allows bending of the insulating coated wire W at the bending auxiliary section 24.

The bending auxiliary section 24 according to the present embodiment has the shape in which the entire thereof protrudes in the radial direction over the entire circumference thereof, and forms an accordion shape such that a plurality of large diameter sections 26 and a plurality of small diameter sections 28 are alternately arranged. Specifically, each of the large diameter sections 26 has inner and outer diameters that are significantly larger than inner and outer diameters of the normal diameter section 22. Each of the small diameter sections 28 is located between large diameter sections 26 adjacent to each other in the axial direction of the insulating coated wire W, and has inner and outer diameters that are smaller than the inner and outer diameters of the large diameter section 26 but larger than the inner and outer diameters of the normal diameter section 22. That is, the bending auxiliary section 24 according to the present embodiment has the shape in which the inner and outer diameters thereof repeatedly increase and decrease in the axial direction. In this case, the small diameter section 28, which is the section serving as a recess in the cross-sectional shape shown in FIG. 2, may also have substantially the same outer and inner diameters as the outer and inner diameters of the normal diameter section 22.

In this insulating coated wire W, the bending auxiliary section 24 can be subjected to bending deformation by a small bending load, contributing to simplification of the wiring operation. Specifically, if a bending load acts on the bending auxiliary section 24 in any direction, a tensile stress is generated at a part that is on the outer side of the bending auxiliary section 24 when it is bent and deformed, and the section having the large diameter sections 26 and the small diameter sections 28 in an alternating manner is easily subjected to elongation deformation against that tensile stress, and thus a large bending deformation can be achieved with a small bending load.

Furthermore, an operation for removing a part of the insulating coating and an operation for mounting the part from which the insulating coating is removed on a protector, which is a member separate from the insulating coated wire, which are required in the conventional case, are not necessary. This is because this easy bendability of the insulating coated wire W is provided by elongation of the bending auxiliary section 24 that is formed on the insulating coating 20 itself constituting the insulating coated wire W. Therefore, an operation for arranging this insulating coated wire W is dramatically simplified.

This effect is particularly notable in the above-described shape in which the large diameter sections 26 and the small diameter sections 28 are alternately arranged, but even in the case where, for example, the bending auxiliary section 24 has a single protrusion section, it is possible to improve the easy bendability of this section. Also in this case, the protrusion section is preferably an entire circumference protruding section that has inner and outer diameters that are larger than those of the normal diameter section 22 due to protruding over the entire circumference of the insulating coated wire W. However, if the direction in which the insulating coated wire W is required to be bent easily is specified, the protrusion section may also be formed only at a part that is on the outer side when the insulating coated wire W is bent and deformed.

The above-described insulating coated wire W can be manufactured reasonably and easily by a method including, for example, the following steps.

1) Preliminary Step (Insulating Coated Wire Material Preparation Step)

In this step, an ordinary insulating coated wire material that includes the above-described center conductor 10 and insulating coating 20 (that is, in which the insulating coating 20 has a constant thickness and a constant diameter) is provided. This insulating coated wire material can be produced by, for example, extrusion molding, as in the ordinary coated electrical wire. A resin having thermoplasticity in addition to the insulating properties is used for the material of the insulating coating 20 for the sake of molding performed later in the heated state. Specifically, cross-linked polyethylene, an ethylene-ethyl acrylate copolymer resin, a thermoplastic polyurethane copolymer resin, or vinyl chloride is preferably used.

2) Metal Mold Arranging Step and Bending Auxiliary Section Forming Step

In these steps, metal molds for forming the bending auxiliary section 24 are arranged on the circumference of at least a part in the axial direction of the insulating coated wire material, and in this state, formation of the bending auxiliary section 24 is performed. In other words, at least a part in the axial direction of the insulating coated wire material is arranged inside the metal molds, and formation of the bending auxiliary section 24 is performed within the metal molds. The formation of the bending auxiliary section 24 is performed by generating a pressure difference between a pressure inside the insulating coating 20 and a pressure outside the insulating coating 20 (that is, a pressure within the metal molds) at the position at which the bending auxiliary section 24 is formed, in which the pressure inside the insulating coating 20 is higher than the pressure outside the insulating coating 20. The formation of the bending auxiliary section 24 using such a pressure difference can be performed by, for example, the following vacuum molding or blow molding.

2-1) Vacuum Molding

Figure 3:
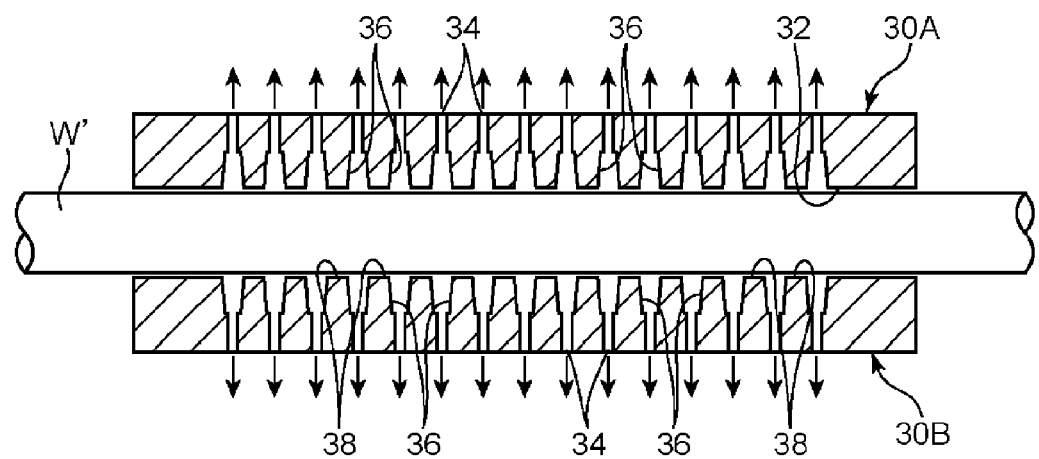
FIG. 3 is a cross-sectional front view showing a lower metal mold and a upper metal mold for forming a bending auxiliary section of the insulating coated wire by vacuum molding.
Figure 4:
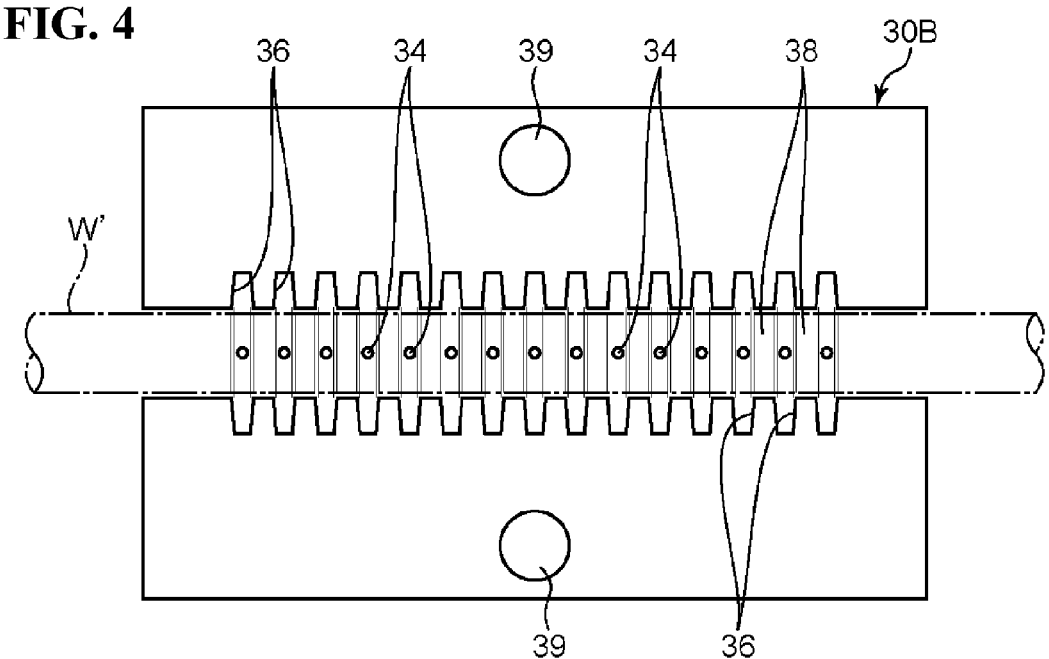
FIG. 4 is a plan view showing the lower metal mold.

The vacuum molding is to generate the pressure difference by reducing the pressure in the space outside the insulating coating 20, and is realized, for example, by the use of a upper metal mold 30A and a lower metal mold 30B as shown in FIGS. 3 and 4 (FIG. 4 shows only the lower metal mold 30B).

The upper metal mold 30A and the lower metal mold 30B have the shapes of sandwiching only the portion, shown in FIGS. 3 and 4, of the insulating coated wire material W' in which the bending auxiliary section is to be formed, and the portion in the vicinity thereof from above and below. Specifically, each of the metal molds 30A and 30B have two end sections in the axial direction and a central section in the axial direction, the end sections and the central section having the different shapes. The two end sections in the axial direction each have a half inner circumferential surface 32 having a semi-circular cross-section that corresponds to the outer circumferential surface of the insulating coated wire material W'. The central section in the axial direction has the shape corresponding to the shape of the outer surface of the bending auxiliary section 24 that is to be formed, that is, has inner surfaces 36 and 38 that protrude outward in the radial direction with the sizes that correspond to the protrusion sizes of the large diameter sections 26 and the small diameter sections 28. Furthermore, each of the upper metal mold 30A and the lower metal mold 30B is provided with a plurality of air suction holes 34, which are communicated with a plurality of portions of the internal surface 32 (in the example shown in FIGS. 3 and 4, the inner surfaces 36 that correspond to the large diameter sections 26, that is, the inner surfaces that farther protrude outward in the radial direction) and are communicated with a common vacuum pump (not shown). Furthermore, each of the metal molds 30A and 30B has bolt insertion holes 39 (only shown with respect to the lower metal mold 30B of FIG. 4) into which a bolt for fastening the metal molds is inserted.

At the time of vacuum molding, the insulating coated wire material W' is sandwiched between the two metal molds 30A and 30B so that only the inner circumferential surfaces 32 of the upper metal mold 30A and the lower metal mold 30B that are formed at the two ends in the axial direction thereof are in close contact with the outer circumferential surface (the outer circumferential surface of the insulating coating 20) of the insulating coated wire material W' over the entire circumference thereof, and the metal molds 30A and 30B are fastened. In other words, both metal molds 30A and 30B are arranged on the circumference of the insulating coated wire material W'.

In this state, a thermoplastic resin constituting the insulating coating 20 is heated to the softening temperature or more (for example, 100° C. to 130° C. in the case of vinyl chloride) using, for example, heaters that are mounted in the metal molds 30A and 30B. Furthermore, the vacuum pump operates to suction air within the metal molds 30A and 30B and generate a negative pressure, and thereby a pressure difference between a pressure Po (that is, a pressure of air immediately outside the insulating coating 20) of air within the metal molds 30A and 30B and a pressure Pi inside the insulating coating 20, where Po<Pi (=atmospheric pressure), is generated. This pressure difference deforms the insulating coating 20 that is heated and softened within the metal molds 30A and 30B into the shape of being in close contact with the internal surfaces of the metal molds 30A and 30B (that is, the insulating coating 20 protrude into the shape corresponding to the inner circumferential surfaces of the metal molds). With this, the bending auxiliary section 24 that has a thickness that is smaller than that of the normal diameter section 22, and includes the large diameter sections 26 and the small diameter sections 28. With this, the insulating coated wire W having the bending auxiliary section 24 is manufactured.

In the case where the insulating coating 20 has a low elasticity and it is difficult for the insulating coating 20 to be in close contact with the inner circumferential surfaces 32 of the metal molds, an O-ring, for example, may also be interposed between the insulating coating 20 and the inner circumferential surfaces 32. Furthermore, a rubber sheet may also be interposed between the metal molds 30A and 30B in order to seal the joint surfaces of the metal molds 30A and 30B. Alternatively, in the case where the insulating coated wire material W is relatively short, elongated metal molds for sealing the entire electrical wire material W may also be used. Also in this case, when air within the metal molds is exhausted and the pressure is reduced, a pressure difference between a pressure Pi inside the insulating coating 20 and a pressure Po outside the insulating coating 20, where Po<Pi (=atmospheric pressure), is generated due to a flow path resistance in the center conductor 10 of the insulating coated wire material W, and thus it is possible to form the bending auxiliary section 24 similarly to the above-described case.

2-2) Blow Molding

Figure 5:
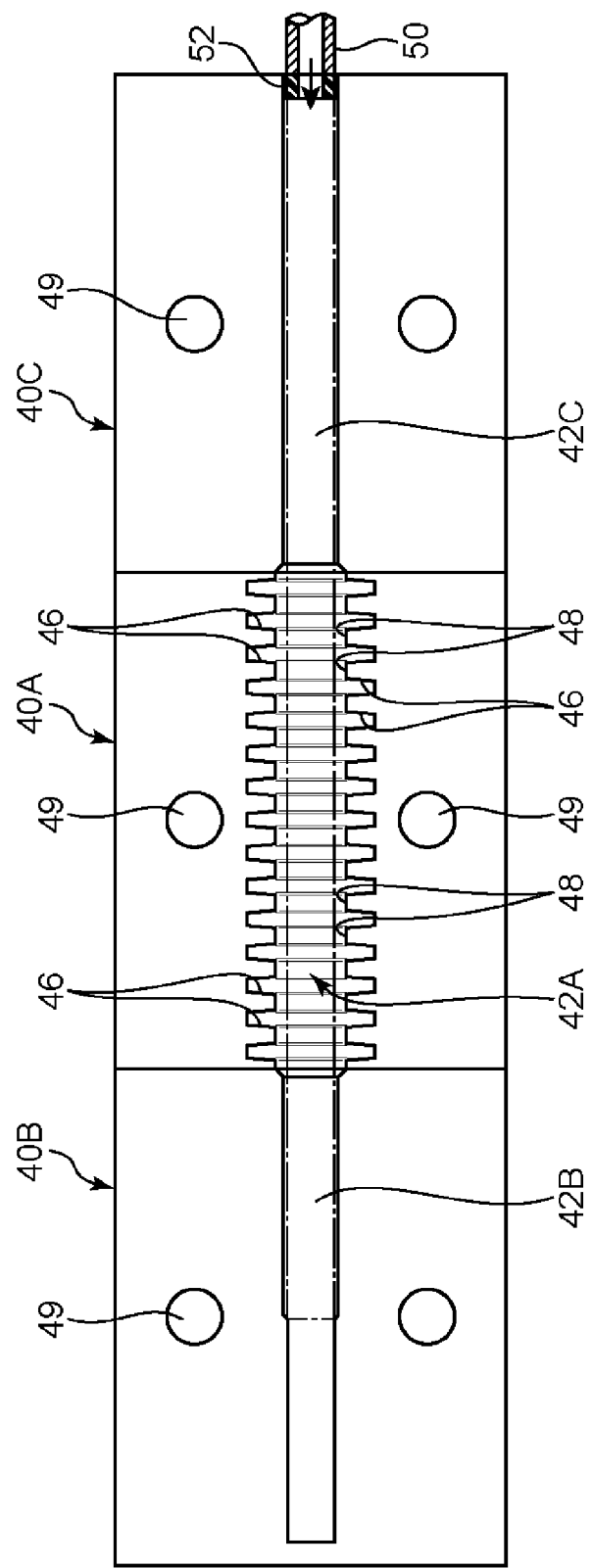
FIG. 5 is a front view showing the half of a metal mold device for molding the bending auxiliary section of the insulating coated wire by blow molding.
Figure 6:
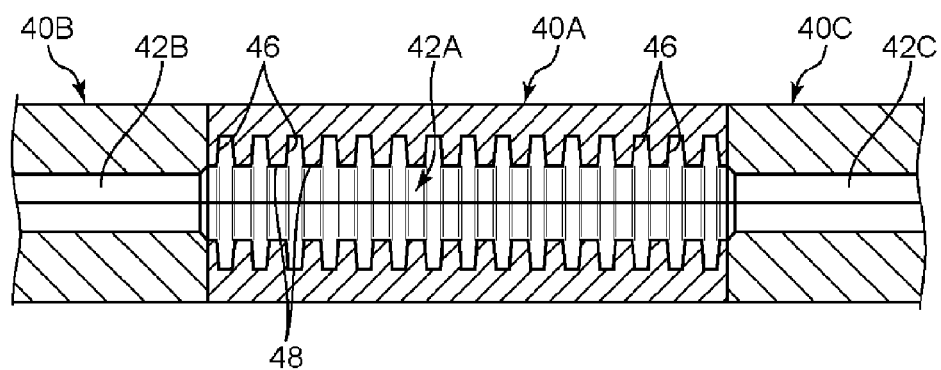
FIG. 6 is a cross-sectional plan view showing the relevant part of the metal mold device.
Figure 7:
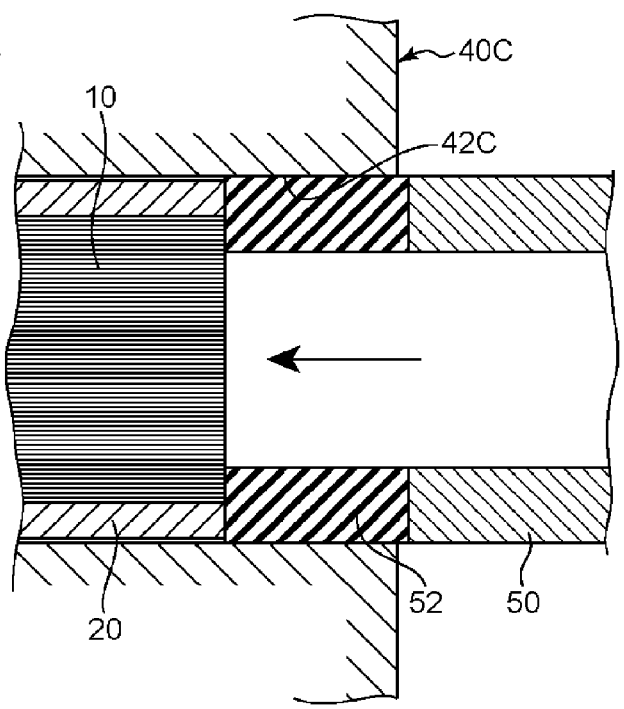
FIG. 7 is a cross-sectional front view showing a gas inlet section of the metal mold device.

The blow molding is to generate the pressure difference by injecting pressure gas (for example, air) into the inside of the insulating coating 20 to increase the pressure inside the insulating coating 20, and is realized by the use of a metal mold device shown in, for example, FIGS. 5 to 7.

This metal mold device includes a central metal mold 40A, and an front metal mold 40B and a rear metal mold 40C that are arranged sequentially in front and rear of the central metal mold 40A. Each of the metal molds 40A to 40C is separated into right and left molds constituting a pair of half molds, and each half mold has bolt insertion holes 49 through which a bolt for fastening the half molds is inserted.

The central metal mold 40A has the shape of sandwiching only the portion, shown in FIGS. 5 and 6, of the insulating coated wire material W' in which the bending auxiliary section is to be formed. Specifically, the central metal mold 40A has an inner circumferential surface 42A in the shape corresponding to the shape of the outer surface of the bending auxiliary section 24 that is to be formed, that is, an inner circumferential surface that includes inner surfaces 46, 48 that protrude outward in the radial direction with the sizes that correspond to the protrusion sizes of the plurality of large diameter sections 26 and the small diameter sections 28 that are included in the bending auxiliary section 24. On the other hand, the front metal mold 40B and the rear metal mold 40C respectively have inner circumferential surfaces in the shapes of externally constraining the sections located in front and rear of the bending auxiliary section 24, that is, the sections serving as normal diameter sections 22. In other words, the front metal mold 40B and the rear metal mold 40C respectively have inner circumferential surfaces 42B and 42C that have diameters so as to be in close contact or substantially in close contact with the outer circumferential surface of the insulating coated wire material W'.

A gas supply pipe 50 for injecting gas into the inside of the insulating coating 20 is connected to the rear metal mold 42C via a seal member 52, and a blower or pump for discharging pressure gas is connected to the gas supply pipe 50. The seal member 52 is arranged at an outer end of the rear metal mold 40C so as to cover the end surfaces of the insulating coating 20 and the center conductor 10 over the border thereof, in order to guide gas supplied from the gas supply pipe 50 only to the inside of the insulating coating 20 (that is, in order to prevent gas from escaping to the outside of the insulating coating 20).

At the time of blow molding, the metal mold device is arranged so that the portion of the insulating coated wire material W' in which the bending auxiliary section 24 is to be formed is sandwiched by the central metal mold 40A from right and left, and portions in front and rear of that portion are sandwiched respectively by the front metal mold 40B and the rear metal mold 40C from right and left. In this state, the portion of the insulating coating 20 that is located in the central metal mold 40A is locally heated to the softening temperature or more using, for example, heaters mounted in the central metal mold 40A. Furthermore, pressure gas is injected into the inside of the insulating coating 20 from an end of the insulating coated wire material W' via the gas supply pipe 50 so as to increase a pressure inside the insulating coating 20, generating a pressure difference between a pressure Po (that is, a pressure of air immediately outside the insulating coating 20) of air inside the metal molds 40A to 40C and a pressure Pi inside the insulating coating 20, where Po (=atmospheric pressure)<Pi. This pressure difference deforms the insulating coating 20 that is heated and softened within the central metal mold 40A into the shape of being in close contact with the internal surface 42A of the central metal mold 40A (that is, the insulating coating 20 protrudes into the shape corresponding to the inner circumferential surface 42A of the metal mold). With this, the bending auxiliary section 24 including the large diameter sections 26 and the small diameter sections 28 is formed. Thus, the insulating coated wire W including the bending auxiliary section 24 is manufactured.

In the blow molding, irrespective of whether or not pressure gas is injected, in addition to the central metal mold 40A, the front metal mold 40B and the rear metal mold 40C, which are shown in FIGS. 5 and 6, are preferably used in order to retain the shape of the section other than the bending auxiliary section 24 (normal diameter section 22), but the present invention is not limited to this. If the insulating coating 20 has a relatively high hardness at normal temperature, and protrusion thereof due to injection of the pressure gas is negligible small, the front and rear metal molds 40B and 40C can be omitted. Alternatively, these front and rear metal molds 40B and 40C may constrain the insulating coated wire material W' not over the entire length thereof but only the portion in the vicinity of the bending auxiliary section 24, that is, only the portion that has the risk of being thermally affected by heating of the central metal mold 40A and softened.

According to the above-described manufacturing method, only by arranging a metal mold having an appropriately shaped inner surface on the circumference of the insulating coated wire material W', and generating a pressure difference between the inside and the outside of the insulating coating 20 in the metal mold while heating the insulating coating 20, it is possible to form an appropriate bending auxiliary section 24 on the insulating coating 20. In this method, since the shape of the inner surface of the metal mold corresponds to the shape of the bending auxiliary section 24 obtained using the metal mold, it is possible to arbitrarily form the bending auxiliary section 24 in an appropriate shape by setting the shape of the inner surface of the metal mold. In other words, the formation of the bending auxiliary section in the required shape can easily be achieved by using the metal mold in the shape corresponding to this shape.

As described above, according to the present invention, an insulating coated wire that can be bent at an appropriate portion without requiring a troublesome operation and a complicated structure, and a method for easily manufacturing the insulating coated wire are provided.

The insulating coated wire provided by the present invention includes a center conductor and an insulating coating that is made of an insulating synthetic resin material and covers the center conductor. The insulating coating includes a bending auxiliary section that is formed at a part in the axial direction thereof and has a thickness that is smaller than that of the other portion, the bending auxiliary section having a shape in which at least a part thereof protrudes outward in the radial direction of the insulating coating electrical wire, and that facilitates bending of the insulating coated wire by elongation deformation thereof.

Furthermore, the method provided by the present invention is a method for manufacturing the insulating coated wire, including the steps of preparing an insulating coated wire material that includes a center conductor and an insulating coating that is made of an insulating thermoplastic resin material and covers the center conductor; arranging metal molds on the circumference of at least a part in the axial direction of the insulating coated wire material, the metal molds having inner surfaces that have sections in the shape of protruding outward in the radial direction with respect to the outer circumferential surface of the insulating coated wire material; and forming, on the insulating coating, the bending auxiliary section that has the shape along the inner surfaces of the metal molds, by generating a pressure difference in which a pressure inside the insulating coating is higher than a pressure outside the insulating coating within the metal molds in a state in which the insulating coating is heated within the metal molds to a temperature at which the thermoplastic resin material constituting the insulating coating is softened, the bending auxiliary section being such that an insulating coating thickness thereof is smaller than that of the other portion, and having the shape that facilitates bending of the insulating coated wire by elongation deformation of the bending auxiliary section.

According to the insulating coated wire having the bending auxiliary section, it is possible to facilitate bending of the insulating coating electrical wire at a position that corresponds to the bending auxiliary section by elongation deformation of the thin insulating coating that constitutes the bending auxiliary section. That is, easy bendability of this insulating coated wire is achieved by elongation of the bending auxiliary section that is formed on the insulating coating itself constituting the insulating coated wire. Therefore, the operation for removing a part of the insulating coating or the operation for mounting the part from which the insulating coating is removed on a protector, which is a member separate from the insulating coated wire, as needed in the conventional case, are not necessary.

The bending auxiliary section preferably includes at least one entire circumference protruding section that has inner and outer diameters larger than those of the section other than the bending auxiliary section due to protruding over the entire circumference of the insulating coated wire. The bending auxiliary section that includes the entire circumference protruding section having that shape can improve the easy bendability of the insulating coated wire in any direction.

Furthermore, the bending auxiliary section further preferably includes a plurality of large diameter sections that have inner and outer diameters larger than those of the section other than the bending auxiliary section due to protruding over the entire circumference at a plurality of positions that are aligned intermittently in the axial direction of the insulating coated wire, and a small diameter section that is located between adjacent large diameter sections of these large diameter sections and has inner and outer diameters smaller than those of the large diameter sections, in an alternating manner, these large diameter sections and the small diameter section forming an accordion shape as a whole. The section in which the plurality of large diameter sections and small diameter sections are arranged in such an alternating manner can efficiently be subjected to elongation deformation so as to allow the insulating coated wire to be bent, making the easy bendability of the bending auxiliary section notable. In this case, the small diameter section may have the same outer and inner diameters as those of the section of the insulating coating other than the bending auxiliary section, or may have outer and inner diameters larger than those of the section other than the bending auxiliary section.

On the other hand, according to the method for manufacturing the insulating coated wire, it is possible to form an appropriate bending auxiliary section on the insulating coating by simple operations of arranging metal mold on the circumference of the insulating coated wire material, and generating a pressure difference between the inside and the outside of the insulating coating within the metal mold while heating the insulating coating. In this method, since the shape of the inner surfaces of the metal mold corresponds to the shape of the bending auxiliary section obtained using the metal mold, it is possible to arbitrarily form the bending auxiliary section in an appropriate shape by setting the shape of the inner surfaces of the metal mold.

The pressure difference between a pressure inside the insulating coating and a pressure outside the insulating coating within the metal mold can be generated not only by exhausting air in the metal mold and reducing the pressure but also by injecting gas such as air into the inside of the insulating coating heated inside the metal mold from at least one end of the insulating coated wire material.

The invention claimed is:

1. A method for manufacturing an insulating coated wire, the method comprising:
    preparing an insulating coated wire material that includes a center conductor and an insulating coating made of an insulating thermoplastic resin material and covering the center conductor;
    arranging a metal mold on the circumference of at least a portion in the axial direction of the insulating coated wire material, the metal mold having an inner surface with a portion having a shape protruding outwardly in the radial direction with respect to the outer circumferential surface of the insulating coated wire material; and
    forming, on the insulating coating, a bending auxiliary section that has a shape along the inner surface of the metal mold, by generating a pressure difference in which a pressure inside the insulating coating is higher than a pressure outside the insulating coating within the metal mold in a condition in which the insulating coating is heated within the metal mold to a temperature at which the thermoplastic resin material constituting the insulating coating is softened, the bending auxiliary section being configured such that an insulating coating thickness thereof is smaller than an insulating coating thickness of the other portion, and having a shape that facilitates bending of the insulating coated wire by elongation deformation thereof.

2. The method for manufacturing an insulating coated wire according to claim 1,
    wherein the pressure difference between a pressure inside the insulating coating and a pressure outside the insulating coating within the metal mold is generated by exhausting air in the metal mold and reducing the pressure.

3. The method for manufacturing an insulating coated wire according to claim 1,
    wherein the pressure difference between a pressure inside the insulating coating and a pressure outside the insulating coating within the metal mold is generated by injecting pressure gas into the inside of the insulating coating heated in the metal mold from at least one end of the insulating coated wire material.

4. An insulating coated wire, comprising:
    a center conductor; and
    an insulating coating made of an insulating synthetic resin material and covering the center conductor,
    wherein the insulating coating includes a tubular section and a bending auxiliary section, the bending auxiliary section being formed at an intermediate portion of the insulating coating in the axial direction, wherein a wall thickness of the insulating coating in the bending auxiliary section is smaller than a wall thickness of the insulating coating in the tubular section, the bending auxiliary section having a shape in which at least a portion thereof protrudes outwardly in the radial direction of the insulating coated wire, and that facilitates bending of the insulating coated wire by elongation deformation thereof.

5. The insulating coated wire according to claim 4,
    wherein the bending auxiliary section includes at least one entire circumference protruding section that has inner and outer diameters larger than those of the tubular section due to protruding over the entire circumference of the insulating coated wire.

6. The insulating coated wire according to claim 5,
    wherein the bending auxiliary section includes a plurality of large diameter sections that have inner and outer diameters larger than those of the tubular section due to protruding over the entire circumference of the insulating coated wire at a plurality of positions arranged intermittently in the axial direction of the insulating coated wire, and a small diameter section that has inner and outer diameters smaller than those of the large diameter sections and is located between adjacent large diameter sections, in an alternating manner, the large diameter sections and the small diameter section forming an accordion shape as a whole.

* * * * *